Figure 1:
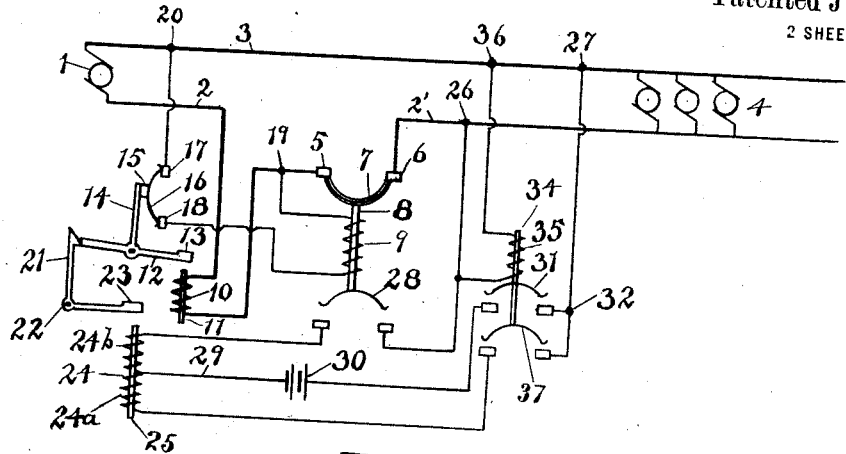

A. R. ANDERSON.
AUTOMATIC CIRCUIT BREAKER.
APPLICATION FILED MAR. 22, 1915.

1,192,368.

Patented July 25, 1916.
2 SHEETS—SHEET 1.

INVENTOR.
Arvid R. Anderson
BY
Dudley T. Fisher
ATTORNEY.

A. R. ANDERSON.
AUTOMATIC CIRCUIT BREAKER.
APPLICATION FILED MAR. 22, 1915.

1,192,368.

Patented July 25, 1916.

INVENTOR.
Arvid R. Anderson
BY
Dudley T. Fisher
ATTORNEY.

UNITED STATES PATENT OFFICE.

ARVID R. ANDERSON, OF COLUMBUS, OHIO.

AUTOMATIC CIRCUIT-BREAKER.

1,192,368.  Specification of Letters Patent.  Patented July 25, 1916.

Application filed March 22, 1915. Serial No. 16,060.

*To all whom it may concern:*

Be it known that I, ARVID R. ANDERSON, a citizen of the United States, residing at Columbus, in the county of Franklin and the State of Ohio, have invented a new and useful Improvement in Automatic Circuit-Breakers, of which the following is a specification.

The present invention relates to certain new and useful improvements in circuit breakers, and especially to that class of circuit breakers which is adapted to open an electric circuit when, from any cause such as a short circuit or an overload, there shall be an excessive flow of current, and shall automatically reclose the circuit upon the restoration of normal working conditions. When the load in such circuit is composed, either wholly or in part, of motors, if the supply of current be suddenly cut off, a potential will be maintained by the motors, acting as generators, until the energy due to the inertia of the armatures and the machinery connected with them, is exhausted. For many reasons it is undesirable to restore the connection between the source of electrical supply and the load until the motors have been disconnected, either by the hand of the operator or by the action of the automatic no load release switches.

When each motor is under the control of a motorman who will immediately disconnect his motor in case of the opening of the circuit, a definite time allowance for such action will be satisfactory, and the reclosing devices may be sufficiently retarded by a dash pot or similar device. If, however, the motors are provided with automatic no load release devices, retarding devices controlled by the potential generated by the elements of the load will give more economical and satisfactory service. In my copending application of even date I have disclosed a somewhat similar combination of elements adapted to effect similar results as are achieved by the combinations hereinafter set forth, but possessing certain fundamental differences which will appear upon comparison of the two applications.

It is the especial object of this invention to provide, in an automatically reclosing circuit breaker, means for controlling the reclosing devices which are dependent upon the resistance of the load circuit, and which shall prevent the reclosing of the main break switch whenever, from any cause, such resistance shall be abnormally low. The devices by which I attain these objects are fully set forth in the following specifications and illustrated in the accompanying drawings of which—

Figure 2:
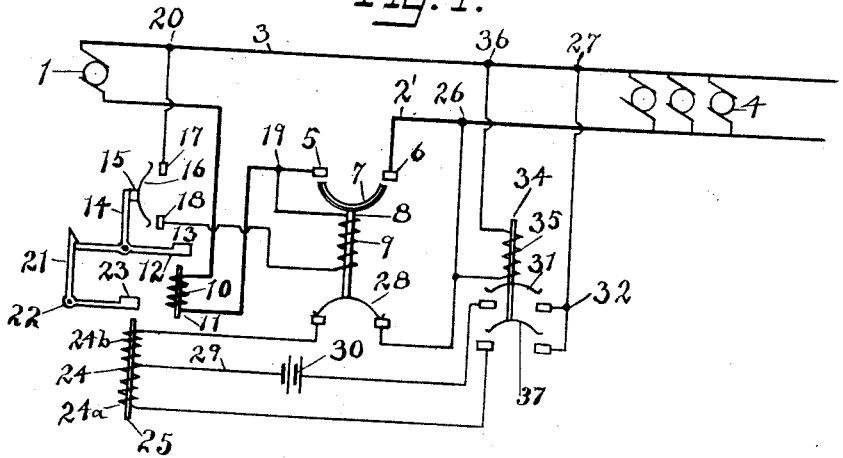
Figure 3:
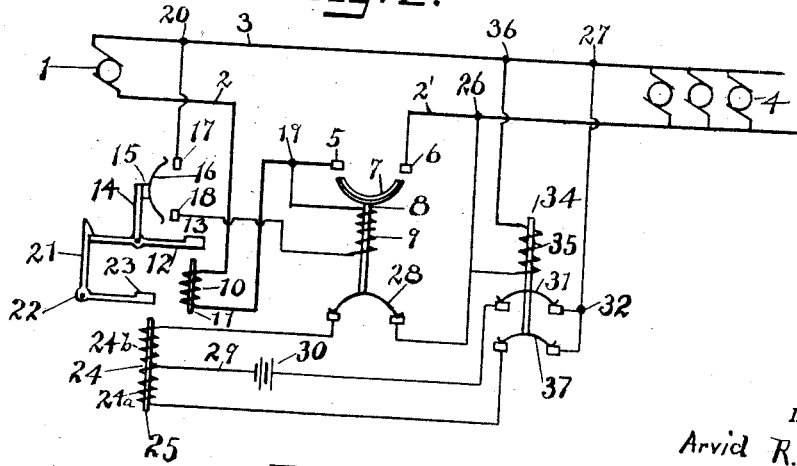
Figure 4:
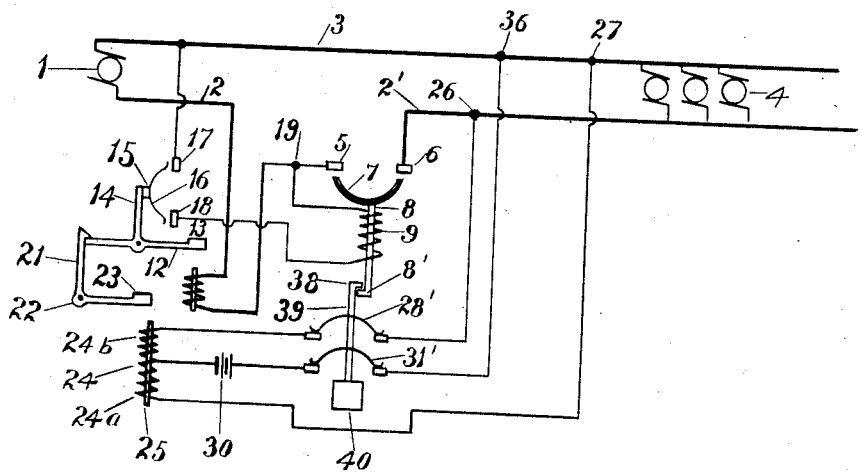

Figure 1 is a diagram showing a circuit, including my improved circuit breaker, under normal working conditions the retarding devices associated with the reclosing mechanism. Fig. 2 is a diagram illustrating the same circuit after the circuit breaker has opened, but before the potential of the load has fallen to a value which will permit the operation of the reclosing mechanism. Fig. 3 is a diagram illustrating the same circuit after the load potential has disappeared and before the reclosing mechanism has acted. Fig. 4 is a diagram illustrating a circuit including my improved circuit breaker having a dash pot retarding device to prevent the too early reclosing of the circuit.

Like numerals refer to similar parts in the several figures.

Referring to the drawings, a generator 1 is connected through the conductors 2 and 3 with a load including the motors 4. In the conductor 2 is included the main break switch of an automatic circuit breaker having contact abutments 5 and 6 adapted to be connected together by the switch member 7. The switch member 7 is attached to and carried by the armature 8 of the solenoid 9, called the reclosing coil, which is arranged to drop to its lower position under the influence of gravity, to break the circuit between the contact abutments and the switch member, or to rise to its upper position, under the influence of the solenoid when electrically energized, to close the circuit. The conductor 2 is also connected in series with a solenoid 10, called the overload coil, having an armature 11 adapted to fall by gravity and to rise by the influence of the current flowing through the conductor. Positioned adjacent the overload coil 10 is a lever 12, pivoted near its center and provided with a weight 13 adapted to contact with the armature 11 to be lifted by it to rotate the lever 12 about its pivot. Attached to the lever 12 is a perpendicular arm 14, having an insulating block 15, to which is attached a switch member 16, adapted to contact with the contact abutments 17 and 18 connected in the shunt circuit extending from the point 19 of the conductor 2, through the solenoid 9 to the point 20 of the conductor 3, to supply energy for the reclosing of the main break switch. A latch 21 is provided to engage the lever 12, to hold the switch 16 out of contact with the abutments 17 and 18, to hold the reclosing mechanism inoperative. The latch 21 is pivotally supported at 22 and is provided with a weight 23 to hold it in engagement with the lever 12. Conveniently positioned with relation to the latch 21 is a solenoid 24, called the trip coil, the armature 25 of which is adapted to contact with the weight 23 to raise it and disengage the latch 21 from the lever 12 to allow the switch 16 to reclose to actuate the reclosing coil. The trip coil 24 is included in a circuit extending from the point 26 of the conductor 2, between the main break switch 7 and the load 4, to a point 27 of the conductor 3. This trip coil circuit is adapted to be cut by the switch 28 attached to the armature 8 and adapted to be closed by it when the main break switch 7 is open and opened when the switch 7 is closed. The trip coil 24 is divided into two sections 24$^a$ and 24$^b$, both of which are adapted to actuate the armature 25. The adjacent ends of the coils 24$^a$ and 24$^b$ are connected together and to a conductor 29 by which they are connected to one pole of a battery 30, which may be of any preferred type such as dry cells or a secondary battery. The opposite pole of the battery 30 is connected through the switch 31 to the point 32 in the trip coil circuit. Current from the battery 30 will divide at the point 32, one part flowing through the coil 24$^a$ and the conductor 29 and the other part flowing through the point 27, conductor 3, load 4 is abnormally reduced the flow of 24$^b$ and the conductor 29 to the battery. In other words the coil 24$^a$ is connected to the battery 30 in parallel with the load, while the coil 24$^b$ is connected in series with the load. The current from the battery 30 will thus divide in inverse proportion to the resistance of the coil 24$^a$ and the coil 24$^b$ plus the load, so that when, through the influence of an overload condition in the circuit or a short circuit, the resistance of the load 4 is abnormally reduced the flow of current through the two sections of the coil 24 will so nearly balance that they neutralize each other to prevent the actuation of the armature 25. With the restoration of normal resistance of the load 4 the current will be reduced in the coil 24$^b$ and increased in the coil 24$^a$ to such an extent that the armature 25 will be lifted into contact with the weight 23 to disengage the latch 21, releasing the switch 16 to allow current to flow through the solenoid 8 to reclose the switch 7. The switch 31, attached to the armature 34 of the solenoid 35 is provided to prevent the flow of current from the battery when it is not required for the actuation of the coil 24.

The coil 35 is connected in parallel with the load 4, the connection with the conductor 3 being at 36. Whenever there is a potential across the conductors of the load, due either to the action of the generator 1 or to the generative action of the load 4 the armature 34 will be lifted to open the switch 31.

Having now set forth the arrangement of parts, I will describe the operation of my circuit breaker. In Fig. 1 I have shown the circuit in normal working condition with current flowing from the generator 1, through the conductor 2, the overload coil 10, the main break switch 7, the conductor 2' and through the load 4 to the conductor 3 returning to the generator. The switch 16 being closed through the influence of the weight 13, the current flows from the point 19 on the conductor 2, through the reclosing coil 9, and switch 16 to the conductor 3, to energize the coil 9 to hold the switch member 7 in contact with the abutments 5 and 6. The weight or position of the armature 11 is so adjusted that a flow of current, adequate to the normal load, through the overload coil will not raise the armature, while a current in excess of that load will cause the armature to rise and engage the lever 12 to open the switch 16, thereby cutting off the current from the coil 9, allowing the armature 8 to fall, opening the switch 7, to protect the apparatus from the injurious effects of such excessive current. When the armature 8 drops to its lower position it closes the switch 28 of the trip coil circuit, but so long as there is potential across the conductors 2' and 3, due to the generative action of the elements of the load, the lock coil 35 will hold the switch 31 open and prevent the possible actuation of the trip coil. This condition of the circuit is illustrated in Fig. 2. As soon as the motors 4, which compose the load, have come to rest, and the potential due to their continued action has disappeared, the coil 35 becomes deenergized, the armature 34 drops and closes the switch 31 to complete the battery circuit. As the switch 28 has already been closed by the action of the armature 8, the circuit will be as shown in Fig. 3, and current from the battery 30 will divide as above described to actuate the trip coil to release the latch 21 to allow the switch 16 to close and effect the reactuation of the reclosing coil to restore the circuit through the main break switch 7. As soon as the potential of the generator 1 is restored to the circuit the switch 31 will be opened completely deenergizing the coil 24 and leaving the latch 21 in position to engage the lever 12 when the breaker opens under an overload or from other cause. In order to protect the coil 24 from possible injury due to a current generated by the elements of the load 4, after the main break switch 7 has opened and the switch 28 has closed. I have added a second switch to the armature 34, which is arranged to cut the conductor between the point 32 and the coil 24ª. When the motors of the load 4 are each in the custody of an attendant or motorman, who will immediately disconnect his motor from the circuit upon the opening of the circuit breaker, a definite time allowance for such action can be made, and in such case a simple dash pot will provide a satisfactory retardation of the reclosing. In Fig. 4 I have illustrated such an arrangement in which the armature 8 terminates downwardly in a hook 8' adapted to engage the hook 38 of the plunger 39 of the dash pot 40. The switches 28' and 31' are attached to this plunger 39 and are closed when it reaches its lower position. Upon the falling of the armature 8 the hook 8' disengages the hook 38 and allows it to settle to its lower position in its own time, but upon the actuation of the coil 9 the armature 8 will lift the plunger immediately to its upper position. As the switches 28' and 31' are not closed until the potential of the load is removed from the circuit, no switch is needed in the conductor extending from the coil 24ª to the point 27'. The action of the coils 24ª and 24ᵇ in the last described arrangement is identical with that described before.

What I claim is—

1. In an automatic circuit breaker adapted to open an electric circuit, the combination with a main break switch, of automatic reclosing devices controlled by a governing means comprising two electromagnetic elements adapted to be energized in opposition to each other when the resistance of the circuit is abnormally low, and a source of electromotive force, independent of the main source of electric supply, to energize the governing means.

2. In an automatic circuit breaker adapted to open an electric circuit, the combination with a main break switch, of automatic reclosing devices controlled by a governing means comprising two electromagnetic elements adapted to be energized in opposition to each other when the resistance of the circuit is abnormally low, a source of electromotive force independent of the main source of electric supply, to energize the governing means, and means to retard the energizing of the governing means.

3. In an automatic circuit breaker, adapted to open an electric circuit, the combination with a main break switch, of automatic reclosing devices controlled by a governing means comprising two electromagnetic elements adapted to be energized in opposition to each other when the resistance of the circuit is abnormally low, a source of electromotive force independent of the main source of electric supply to energize the governing means, and means actuated by the electromotive force of the load to retard the energizing of the said governing means.

4. In an automatic circuit breaker adapted to open an electric circuit, the combination with a main break switch, of automatic reclosing devices controlled by a governing means, comprising two electromagnetic elements adapted to be energized in opposition to each other to prevent the actuation of the reclosing devices when the resistance of the circuit is abnormally low, and to permit the actuation of the reclosing devices upon the restoration of normal working conditions in the circuit, and a source of electromotive force independent of the main source of electric supply to energize the governing means.

5. In an automatic circuit breaker adapted to open an electric circuit, the combination with a main break switch, of automatic reclosing devices controlled by a governing means comprising two electromagnetic elements adapted to be energized in opposition to each other to prevent the actuation of the reclosing devices when the resistance of the circuit is abnormally low, and to permit the actuation of the said reclosing devices upon the restoration of normal working conditions in the circuit, a source of electromotive force independent of the main source of electric supply to energize the governing means and means to retard the actuation of the governing means.

6. In a circuit breaker adapted to open an electric circuit, the combination with a main electric circuit, the combination with a main break switch, of automatic reclosing devices, controlled by a governing means comprising two electromagnetic elements adapted to be energized in opposition to each other to prevent the actuation of the reclosing devices when the resistance of the circuit is abnormally low, and to permit the actuation of the said reclosing devices upon the restoration of normal working conditions in the circuit, and means actuated by the electromotive force of the load to retard the actuation of the governing means.

7. In a circuit breaker adapted to open an electric circuit, the combination with a main break switch, of means for reclosing the said switch, mechanically actuated means to govern the reclosing means, electrically actuated means to release the mechanically actuated means, comprising two electromagnetic elements adapted to be energized in opposition to each other to prevent the release of the mechanically actuated means when the resistance of the circuit is abnormally low, and a source of electromotive force independent of the main source of electric supply to energize the electromagnetic elements.

8. In a circuit breaker adapted to open an electric circuit, the combination with a main break switch, of means for reclosing the said switch, mechanically actuated means to govern the reclosing means, electrically actuated means to release the mechanically actuated means comprising two electromagnetic elements adapted to be energized in opposition to each other to prevent the release of the mechanically actuated means when the resistance of the circuit is abnormally low, a source of electromotive force independent of the main source of electric supply to energize the electromagnetic elements and means to retard the actuation of the releasing means.

9. In a circuit breaker adapted to open an electric circuit, the combination with a main break switch, of means for reclosing the said switch, mechanically actuated means to govern the reclosing means, electrically actuated means to release the mechanically actuated means comprising two electromagnetic elements adapted to be energized in opposition to each other to prevent the release of the mechanically actuated means when the resistance of the circuit is abnormally low, a source of electromotive force independent of the main source of electric supply to energize the electromagnetic elements and means to retard the actuation of the releasing means.

10. In a circuit breaker adapted to open an electric circuit, the combination with a main break switch, of means for reclosing the said switch, mechanically actuated means to govern the reclosing means, electrically actuated means to release the mechanically actuated means, comprising two electromagnetic elements adapted to be energized in opposition to each other to prevent the release of the mechanically actuated means when the resistance of the circuit is abnormally low, a source of electromotive force independent of the main source of electric supply to energize the electromagnetic elements, and means actuated by the electromotive force of the load to retard the actuation of the releasing means.

11. In an automatic circuit breaker adapted to open an electric circuit, the combination with a main break switch, of automatic reclosing devices controlled by a governing means comprising two electromagnetic elements adapted to be energized in opposition to each other when the resistance of the circuit is abnormally low, and means actuated by the electromotive force of the load to retard the energizing of the said governing means.

12. In an automatic circuit breaker adapted to open an electric circuit, the combination with a main break switch, of automatic reclosing devices controlled by a governing means comprising two electromagnetic elements adapted to be energized in opposition to each other to prevent the actuation of the reclosing devices when the resistance of the circuit is abnormally low, and to permit the actuation of the said reclosing devices upon the restoration of normal working conditions in the circuit, a source of electromotive force independent of the main source of electric supply to energize the governing means and means actuated by the electromotive force of the load to retard the actuation of the governing means.

13. In a circuit breaker adapted to open an electric circuit, the combination with a main break switch, of means for reclosing the said switch, mechanically actuated means to govern the reclosing means, electrically actuated means to release the mechanically actuated means comprising two electromagnetic elements adapted to be energized in opposition to each other to prevent the release of the mechanically actuated means when the resistance of the circuit is abnormally low, and means actuated by the electromotive force of the load to retard the actuation of the releasing means.

ARVID R. ANDERSON.